Nov. 18, 1947.  C. E. OSBORNE  2,431,274
METHOD AND APPARATUS FOR MIXING AND RENDERING
PLASTIC PULVERULENT MATERIALS
Filed Sept. 23, 1944
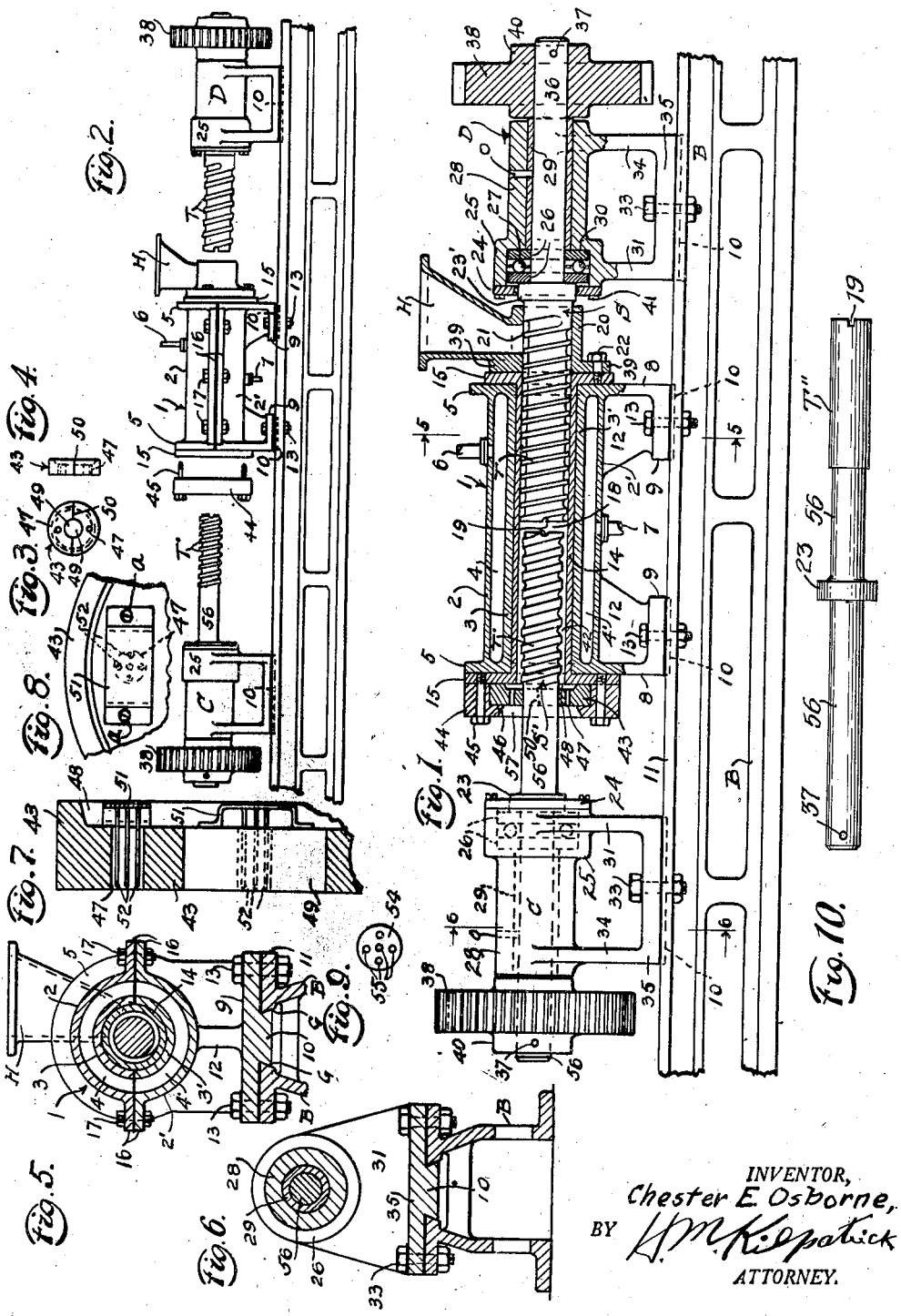
INVENTOR,
Chester E. Osborne,
BY
ATTORNEY.

Patented Nov. 18, 1947

2,431,274

UNITED STATES PATENT OFFICE 2,431,274

METHOD AND APPARATUS FOR MIXING AND RENDERING PLASTIC PULVERULENT MATERIALS

Chester E. Osborne, Rahway, N. J., assignor to Paul O. Abbe, Inc., Little Falls, N. J., a corporation of New Jersey Application September 23, 1944, Serial No. 555,502

16 Claims. (Cl. 18—12)

This invention relates to an improvement in apparatus, and method of incorporating, or rendering plastic, with suitable solvents or bonds, granular or pulverulent materials, which are used as aggregates for making paints, lacquers, resins, rubber, smokeless powder, some food products, and various types of solidified plastic products, and is also useful for intimately intermixing and forming pulverulent plastic and electrolytic compounds or ingredients.

This application is a continuation in part of my co-pending application Serial No. 242,200, filed November 25, 1938, claims 1 to 16 herein being copies of allowed claims in said co-pending application.

The present device has, as a principal feature, the provision of a housing in which is located a constantly rotating mixing and reducing means whereby, by a continuous, operation thereof, granular or pulverulent materials may be fed, mixed, treated, formed and discharged therefrom, in a continuous manner.

A further, specific feature is in the provision of a rotary means in a cylindrical chamber, comprising driven feed and mixing parts or shafts which may be driven at similar or dissimilar speeds.

A further feature is the provision, in a mixing chamber, of means whereby said parts may comprise alined feed and mixing worms the ends of which may, if desired, be spaced apart and operatively held clear of each other thus providing a mixing chamber therebetween. In some instances the ends of the worms may not require the provision of a mixing chamber, and the worms working diameters may then be substantially continuous.

In some instances the mixing shaft may be plain.

A further feature of advantage is that the worm structures are so constructed that they may be rotated in the same or opposite directions with one another. The worms may also be provided with threads thereon of like or opposite pitch or lead, so that during the operation thereof, they may feed material toward each other, to cause an intimate mixing, shearing, and compressive kneading of the material being treated.

In other forms the worm may be made of the same pitch, but of different diameters, but may be rotated in opposite directions of rotation, thus to obtain counter-acting mixing operations, or counter-flow of the material being treated.

In the operation of the herein apparatus, the respective diameters of the worms, the respective pitches of the threads and the speeds and directions of rotation of the respective worms may be altered, as may be required by materials being treated.

During the mixing and kneading operation, as will be more readily understood as described later, the materials being treated may be intermixed with a sufficient amount of a solvent or suitable liquid bond, to cause the material to become plastic to any desired degree of viscosity and to finally be discharged from the discharge end of the apparatus in a completely plastic, molded condition, in any varying degree of viscosity desired.

A further advantage in the present construction, is in the provision of a foraminous discharge or extrusion plate which is located at the discharge end of the apparatus, the perforations of the said plate being of any desired form, dimension or contour, and from which apertures the thoroughly mixed, plastic material is discharged, continuously, in the desired cross sectional contour and dimension.

A further advantage of the present construction, as will hereinafter be explained more in detail, is in the provision and means in association with the extrusion plate or die, whereby aggregates of smokeless powder, after being thoroughly mixed and made plastic therein, may be extruded through the said plate, and, during such extrusion the discharged material is provided with the usual central perforations, so that, when the apparatus is used in the manufacture of smokeless powder, the operation is continuous. After the extrusion process, the smokeless powder may be dried and broken into the desired lengths involved. This particular, improved method of making smokeless powder eliminates undesired hazards, and eliminates extra handling and operations, which are current practice.

The foregoing, and other features of advantage will be apprehended as the herein description proceeds, and it will be obvious that modifications may be made in the structure herein, without departing from the spirit hereof or the scope of the appended claims.

In the drawings,

Fig. 1 is a longitudinal, partially sectioned view of the apparatus, in elevation, showing the device in operative assembly;

Fig. 2 is a view, in elevation, on a reduced scale, showing the manner of separation of the milling and feeding worms from the apparatus for inspection, repair, replacement or substitution, and cleaning;

Figs. 3 and 4 are front and side views of the extrusion plate;

Fig. 5 is a sectional view taken on line 5—5, Fig. 1, looking in the direction of the arrows;

Fig. 6 is a sectional view, taken on the line 6—6, Fig. 1, looking in the direction of the arrows;

Fig. 7 is an enlarged, fragmentary sectional view of the extrusion plate showing certain details of structure;

Fig. 8 is a fragmentary enlarged view in side elevation of the inside face of the extruding plate when assembled for the manufacture of smokeless powder;

Fig. 9 is an enlarged end view of a smokeless powder grain made by the present apparatus;

Fig. 10 is a side elevation showing a modified form of mixing and reducing shaft, the shaft being without any worm and plain.

In Figs. 1 and 5, there is shown the chambered structure, in the present instance, comprising an inner solid walled mixing cylinder 14, which is provided with integral end flanges 15—15, and is without any joints within its interior. The mixing cylinder 14 is rigidly mounted within an outer split casing, generally denoted by 1, Fig. 1, and as seen in Figs. 2 and 5, the split casing is constructed of upper and lower outer sections 2 and 2' and upper and lower inner sections 3 and 3'. Both the inner and outer sections are preferably cylindrical and are integrally connected to cylindrical end flanges 5—5, the lower flange sections merging into clamping side flanges 16—16, Figs. 4 and 5.

The lower outer housing section, Fig. 1, has its end flange portions 5—5 integrally connected to supporting base extensions 8—8; these in turn being provided with angular foot extensions 9—9, which are each provided with gib extensions 10, Fig. 5, said gibs 10 being slidably engaged in gibway G, located in the bed plate or base B. This base may be firmly mounted on a suitably rigid foundation, not shown, but understood.

The base extensions may be provided with web connections 12—12, between the lower portion of outer housing section 2' and the inner faces of the base extensions 8—8 and 9—9 rigidifying the housing construction and its attachment to base frame B. The base extensions 8—8—9—9 are removably locked by locking screws, studs or bolts 13—13 to base B, in a suitable manner.

In assembling the mixing cylinder 14 in its operative relation it is clamped in its operative position by flange clamping screws 17—17 which bind the outer and inner housing structure to mixing cylinder 14.

The outer housing 1 is provided with a steam chamber 4 which surrounds the inner mixing cylinder 14 so that, when desired, steam or hot or cold water may be introduced at the inlet port or duct 7, and discharged from discharge, or outlet duct 6, under valve and pressure control means not shown, but understood.

The apparatus is provided with a material holding and feeding hopper H, the lower end being provided with a bored hub portion 20, the bore of which rotatably supports the outer end of a feeding worm 21. The hopper is provided on its face, adjacent the flange 15 of the mixing cylinder 14, with an attaching flange 19, which is firmly held to the flange 15 of said cylinder 14, by a series of headed bolts, one of which 22, is shown in Fig. 1.

The outer end 23' of the worm T is provided with an integral thrust shoulder 23, which is in rotative fit with a grooved packing gland collar 24, this in turn being affixed to a ball thrust housing 25 by suitable screws. In the interior of the housing 25 are located two opposed, spaced hardened, ball thrust collars 26, between which are located a ring of steel thrust balls 27, thus the operative rearward thrust of the worm 21 is taken up by the shoulder 30 of the bearing, generally denoted by D.

The bearing 28 is provided with an inner, fixed bearing liner 29, in which is rotatably supported the integral, rear shaft extension 36 of the feed worm T. An oil aperture O is provided for lubricating the shaft 36 and its bearing. On the rear extending end of shaft 36 is located a driven means, such as a gear 38, which is affixed to said shaft end by a suitable keying means, such as a key pin 37, which passes through the gear hub 40 and the shaft 36.

The bearing 28 is provided with integral support legs 31—34, which in turn are provided with a common slide base 35, this in turn being provided on its under face with an extending gib 10, which fits into and slides in the gib-way G—G, in base B, as described for slide bases 8—8.

The bearing support comprising said bearing 38, legs 31—34 and slide base 35, generally denoted by D, Fig. 1, and the worm 21 and drive means carried thereby are removably held in operative position as illustrated in Fig. 1 by a threaded lock bolt 33.

It being desirable at times, to slide the feeder worm and its appurtenant support means away from the mixing cylinder, this is accomplished by removing the bolt 33, and sliding the entire assembly rearwardly on base B, as shown in Fig. 2. This permits of inspection, repair or replacement of the worm T, as desired.

In practical operation, the outside diameter of the threads of worm T is such as to rotatively fit in the bores of the mixing cylinder 14, thereby to insure positive feed of the material, supplied by the hopper H, to the mixing chamber and from thence through the apparatus and through the extrusion discharge plate 43.

At the opposite end of the apparatus, a second bearing, generally denoted by C, Figs. 1, 2 and 6, is constructed in detail and mounted upon base B, for slidable removal of bearing and apparatus carried thereby, exactly as described for bearing D except that the collar 44 and the extruding die plate 43 are first removed, as shown in Fig. 2, and some of the structural details are indicated in their structural similarity by the use of like indices for indicating like parts. The bearing C, and its appurtenant apparatus, is shown in Fig. 2 as being slidably backed away from the cylinder 14, so as to fully expose the mixing worm T'. The mixing worm T' may be driven in either direction by a gear 38, said gear being keyed to the end of the shaft 56, by a key pin 37, which passes through the gear hub 40 and the end of the shaft 56.

The mixing worm T', as will be noted in Fig. 1, is of smaller diameter than the feeding worm T, and may have its threads in the same direction as, or in a reverse helix to that of the worm T. It may also be of unlike pitch or lead, so that during rotation of both worms, the direction of rotation of each may be opposed to each other, and the compressive action on the material being treated by the differently feeding worms tending to amalgamate the material into a plastic condition quickly.

The worm T' may be constructed and rotated to feed the material engaged by the worm T' toward the worm T or more or less slowly toward the die plate 43.

Instead of providing the worm T', the shaft 56 may be provided with a plain mixing portion T'' as in Fig. 10, as it has been found that the apparatus is surprisingly efficient with the plain mixing portion T''. In any case, the action of the shafts 36 and 56 is such that the material passes slowly through the mixing chamber 42 and is there a long time reduced and mixed under very high pressure.

The invention is not limited to the relative directions of the threads of the worms T and T'. It is obvious that if the threads are in the same direction, as shown, that the rotation must be in opposite directions to cause opposed feeding. To give opposed feeding while rotating in the same direction would require that the threads should have opposite pitch. Thus to give opposed feeding, it is possible to have the threads of the same or opposite pitch depending upon whether the direction of rotation are in opposite or the same directions.

The part of the shaft 56 within the cylinder may be relatively much longer or not as long as shown; and for some purposes the shaft may be plain or only part is provided with worm threads, or all of the threads need not be in the same direction; and in extruding some shapes of smokeless powder, rods or tubes, it is desired that the pressure at the die be not too much reduced by the counter threads T'.

The active portions of the worm T' or plain portion T'' may be about four times its diameter or less or much more if conditions require; and their diameter may be nearly as large as that of the chamber 42.

The action of the shafts 36 and 56 tends to expel all air from the material and to force the material, as it travels through the mixing cylinder, into the mixing chamber or space 18, Fig. 1, which is formed by and between the spaced, adjacent ends of the shafts. The ends of the shafts may each be provided with traverse grooves 19, which are cut into the faces of said ends. One or both of these may be omitted if desired. While only one groove is shown traversing said ends, a plurality of grooves 19 may be cut therein.

During the travel of the material through the mixing cylinder, it is fed in constant volume by said feed worm T, and is gradually forced into said mixing chamber 18, and then is gradually forced past said mixing chamber and into the thread of the mixing worm T' or the plain portion T''. If the worm T' counterfeeds, the material is forcibly reversed in its flow. The material is thoroughly mixed and gradually fills the clearance 42 around the mixing shaft, and the piled up excessive material in the clearance is gradually forced toward the discharge end of the apparatus and during such flow is constantly sheared, reduced and mixed by the mixing shaft 56.

When the material finally reaches the extrusion discharge recess or space S', it is forcibly extruded through the apertures 47—47, of the extrusion plate 43 and the discharged, thoroughly mixed and plastic material is removed for further treatment, such as drying, breaking up, etc.

During the constant feeding of the dry, pulverulent material into the hopper H, there is introduced sufficient liquid solvent, liquid bond, water or similar plasticizing ingredients in sufficient quantity to reduce the dry material to the desired viscosity, according to its final utilization. This viscosity varies in accordance to the use to which the finally discharged product, such as paints, lacquers, resins and the like, as hereinbefore noted. These products are functionally different, for different uses. Some end products of the herein apparatus may be of acetate or phenolic bases and are afterwards used for molding objects of different function and use, and these varying aggregates require that the final product be of varying viscosities, heavy or light.

The diameter of the shaft 56 is smaller than the diameter of the mixing worm T' (Fig. 1) or portion T'' (Fig. 10) thereon, the larger diameter part terminating near the outside face of the flange 15 of the mixing cylinder 14. The extrusion plate 43 is of disc formation and is diametrically split at 50, Figs. 3 and 4 to permit it to be fitted over the shaft 56 by its split bore 49. This construction affords means to remove the plate for repair or replacement, or in some instances, replacement by a plate having larger or smaller extrusion apertures, or having apertures of different cross-sectional contours.

When placed in operative position on the shaft 56, the extrusion plate 43, having a recessed face 48 to provide the end or discharge clearance recess 5', is then locked in firm position by a plate locking ring 44, which has a bevel-ended flange 46, which engages the perimeter of the plate 43, the flanged construction providing an open bore 57, Fig. 1, and the said plate locking ring 44 is rigidly and removably held to the flange 15 of the mixing chamber cylinder 14 by suitable headed bolts 45. By this construction, the extrusion plate 43 is firmly and removably held in a leak proof assembly with the flange 15 of the mixing chamber 14.

If during operation the worm T' moves material away from the discharge end and is, therefore, free of tendency to feed the engaged and rubbed material in a direction toward the discharge end. This avoids hastening the material through the apparatus by the worm T', whereby the material may be longer subjected to the rubbing and reduction action while free of such pressure as would cause packing at the discharge end. As the worms T and T' are separately driven, the amount of reducing action of the worm T' relative to the speed of material may be conveniently adjusted.

The present apparatus is particularly fitted to manufacture smokeless powder, and to this end an extruding plate or die 43, shown in enlarged fragment and cross section, in Fig. 7 and in fragmentary, enlarged elevation in Fig. 8. The plate is made in two split halves, as described for Figs. 3 and 4, and has a recessed face 48. The plate is provided with extrusion apertures 47, Figs. 7 and 8, into which extend a plurality of wires 52. These wires are rigidly mounted at one end in an offset bracket 51, the offset portion being mounted out of contact with the face of recess 48, and is thereby spaced therefrom. The bracket 51 has two opposed and angled foot portions, which rest on the face of recess 48, and these are held thereto by screws a—a, Fig. 8. Thus the extruding apertures are provided with spaced apart prongs, which, when the smokeless powder batch is extruded therethrough, causes a plurality of more or less symmetrically located holes to be continuously formed in the extruded powder forming rods, during the process of extrusion. The rods may be afterwards dried and cut, or broken into the desired proportioned grains.

During the making of the smokeless powder, the various ingredients are entered, continuously, into the hopper H, with sufficient liquid to amalgamate the mass to the desired stiffness, and upon reaching the discharge end of the herein apparatus, the moving material surrounds the bracket 51 and enters the extruding apertures 47, and the extruded material emerges continuously from the apertures 47, with a series of continuous, parallel apertures 55 within the body 54 thereof, these being formed therein, automatically by the act of extrusion, and as illustrated in Fig. 9, which is a side view of a smokeless powder grain, enlarged.

Tubular bodies of various materials, may also be made in the foregoing apparatus, by the provision of suitable extruding die plates. It is amongst the possibilities of the present apparatus to make macaroni, with the provision of a proper extruding die, and the use of Semolina wheat flour, admixed with water and both thoroughly admixed by and extruded from the herein disclosed apparatus.

Any suitable form of drive means for the shafts 36 and 56 may be utilized, and such drive may consist of a separate electric motor geared to each gear 38, or an individual electrically driven chain drive or a pulley counter drive.

In the operation of the apparatus herein, some materials may require temperature treatment, either hot or cold, and to this end the housing 1, as illustrated in Figs. 1 and 5, is provided with a chamber 4, and, as required, steam, hot or cold water may be passed into the inlet port 7, and out of the discharge port 6, thus to transfer temperatures desired to the material in cylinder 14, during operation on the material being treated. In this event, the material may require no liquid bond or solvent, applied heat being sufficient for the purpose of rendering the material plastic.

The present apparatus is particularly adapted for treating unvulcanized rubber for incorporating tempering ingredients therein for increasing the temper of the rubber for vehicle tire treads and the like. By the present method and apparatus, a batch of unvulcanized rubber may be fed into hopper H, together with predetermined quantities of carbon black, or other known tempering materials, and thus impregnate the batch with a greater amount of tempering material than heretofore possible by any other known method, and thus the wearing qualities and toughness of the rubber, for tires and other uses, is greatly enhanced.

The grinding, mixing and reducing action of the several apparatus methods herein is surprisingly more efficient than was thought possible, producing a colloidal action equivalent to a complete dispersion of the particles during the mixing. For instance, carbon black with a little solvent may in the apparatus be reduced to a plastic of colloidal consistency which will when thinned out remain in suspension without settling and which under the microscope will show particles of carbon of colloidal size.

Having thus described the invention, what is claimed is:

1. A material mixing machine comprising a mixing cylinder, a base means for mounting said cylinder in operative position thereon, a material feeding hopper discharging into the cylinder, a threaded feeding worm operatively mounted for rotation in said cylinder at one end thereof, to feed material from said hopper into said cylinder, an extrusion die connected to said cylinder at the opposite end thereof, a threaded mixing worm operatively mounted in said cylinder for rotation therein and through said die, for mixing the material fed thereto from said first worm, the threads of said worms being of opposite pitch and means for rotating said worms.

2. A material mixing machine comprising an open ended mixing cylinder, a temperature controlling jacket surrounding said cylinder, a base means for mounting said cylinder and jacket in operative position thereon, a material feeding hopper connected to said cylinder, a threaded feeding worm operatively mounted for rotation in said cylinder at one end thereof, to feed material from said hopper into said cylinder, an extrusion die connected to said cylinder at the opposite end thereof, a threaded mixing worm operatively mounted for rotation in said cylinder and said die for mixing the material fed thereto from said first worm, the threads of said worm being of opposite pitch and means for operating said worms.

3. A pulverulent material mixing machine comprising an open ended mixing cylinder having inlet and discharge ends, a base, a gib-way on said base for fixedly mounting said cylinder in operative position thereon, a material feeding hopper mounted on the inlet end of said cylinder, a threaded, rotatable feeding worm fixedly, releasably and slidably mounted in said cylinder at the inlet end to feed material from said hopper into said cylinder, an extrusion die connected to said cylinder at the discharge end thereof, a threaded mixing worm rotatably mounted through said die and into the discharge end of said cylinder for mixing the material fed thereto from said first worm, the threads of said worms being of opposite pitch, means for operating said worms and a temperature conducting housing enclosing said cylinder.

4. A pulverulent material mixing machine comprising an open ended mixing cylinder, a base, means for fixedly mounting said cylinder in operative position thereon, a material feeding hopper discharging into one end of the cylinder, alined threaded feeding and mixing worms rotatively mounted in said cylinder at opposite ends thereof to linearly feed material from said hopper by said feeding worm to said mixing worm, an extrusion die connected to said cylinder at the mixing worm end thereof, the mixing worm being rotatively mounted through said die, the threads of said worms being of opposite pitch, the adjacent ends thereof being spaced apart to provide a mixing chamber therebetween, the faces of the adjacent worm ends having material mixing means thereon, and means for operating said worms, both worms being between the hopper and die.

5. The method of mixing and rendering plastic a pulverulent or granular material consisting of introducing a liquid bond or solvent into the material, then feeding the material under high pressure in one direction to a mixing chamber, then compressively counterfeeding the fed material under high pressure in a reverse direction to said first feeding direction to mix the material and its bond or solvent, continuing to counterfeed the mixed material against the fed material and then extruding the mixed material.

6. In mixing, a method which comprises providing a tubular space; forcing material under high pressure into said space substantially at one end, thereby to compress the material in said space; allowing escape of the material substantially at the other end of the space at high pressure and in small amount, thereby to maintain the material at high pressure in the space and cause portions of the material to pass slowly along the outer face of said space in a direction from said first named end to said other end; and engaging limited spaced quantities of said material disposed along helical faces disposed transversely around the inner face of said tubular space and spaced along the inner surface of said tubular space and moving said quantities counter to said first direction, thereby to cause said quantities to be engaged, reduced and mixed by engagement with said portions moving in said first direction said pressures being high enough to effectively reduce the material.

7. In mixing, an apparatus which comprises means providing a tubular space; means for forcing material under high pressure into said space substantially at one end, thereby to compress the material in said space; means for allowing escape of the material at the other end of the space at high pressure and in amounts small enough to maintain the material at high pressure in all parts of the space and cause portions of the material to pass slowly near and along the outer face of said space in a direction from said first named end to said other end; and means for engaging limited spaced quantities of said material disposed along faces transverse to the axis of said space and spaced along the inner surface of said tubular space and moving said quantities counter to said first direction, thereby to cause said quantities to be engaged, reduced and mixed by engagement with said portions moving in said first direction.

8. An apparatus comprising means providing a tubular space having a discharge end; a closely fitting rotary worm in said space spaced from the discharge end for forcing material under pressure into the end portion thereof between said worm and discharge end, thereby to compress the material in said portion; discharge means for allowing discharge of the material at said discharge end in small amount, thereby to maintain raised the pressure of the material in said portion and cause the material to pass slowly along said portion to said discharge end; and a separate rotary worm smaller in diameter than said space, and disposed in said portion for engaging said material; means for rotating said separate worm in a direction to move some of said material in a direction away from the discharge end, to further increase the pressure of the material and cause said material to be engaged under high pressure with a separate worm and to be reduced and engaged under high pressure with and mixed with said portions moving toward the discharge end.

9. In mixing, a method which comprises forcing material under high pressure into one end of, and along, an elongated laterally closed space, thereby to compress the material in said space; allowing escape of the material at the other end of the space substantially at high pressure and in small amount, thereby to maintain the material at high pressure in the space and cause portions of the material to pass slowly near and along the outer face of said space in a direction from said first named end to said other end; and forcing limited spaced quantities of said material to counterfeed under high pressure in a direction opposite to said first direction and in contact with said portions, thereby to cause said quantities to be engaged, reduced and mixed by high-pressure engagement with said portions moving in said first direction.

10. A method which comprises forcing material under high pressure into a tubular space substantially at one end thereof to compress the material in all parts of said space; allowing escape of the material substantially at the other end of the space at high pressure and in small amount, thereby to maintain the material at high pressure in all parts of the space and cause portions of the material to pass slowly along the outer face of said space in a direction from said first named end to said other end; and engaging limited spaced quantities of said material spaced along the inner surface of said tubular space and moving said quantities counter to said first direction, said pressure being high enough to cause said quantities to be engaged, effectively reduced and mixed by engagement with said portions moving in said first direction.

11. An apparatus which comprises means providing an elongated laterally closed space; means for forcing material under high pressure into said space near one end of said space; thereby to compress the material in and force it along said space; means for allowing escape of the material substantially at the other end of the space at high pressure and in small amount, thereby to maintain the material at high pressure in the space and cause portions of the material to pass slowly along said space in a direction from said first named end to said other end; means for counterfeeding limited quantities of said material under high pressure in a direction opposite to said first direction and in contact with said portions, thereby to cause said quantities and portions to be interengaged and to be reduced and mixed by high pressure engagement as said portions move in said first direction.

12. In mixing and reducing apparatus, the combination of structure means providing an elongated space having an inlet end and a long discharge end portion having a discharge outlet; forcing means for forcing material under high pressure from the inlet end into the discharge end portion; and a rotary shaft disposed longitudinally in said portion, for engaging said material and cooperating with said structure means to form an elongated chamber of annular cross-section; drive means for rotating said shaft and operating the forcing means; the effective cross section of said chamber being at least several times greater than the effective cross-section of said outlet; the face of the shaft being constructed and arranged to provide means to restrain movement of the engaged material in a direction toward the discharge end.

13. An apparatus as in claim 12, the drive means of the shaft operating entirely independently of the operation of the forcing means.

14. In mixing and reducing apparatus, the combination of structure means providing an elongated space having an inlet end and a long cylindrical discharge end portion having a discharge outlet; means including a rotary worm in said space for forcing material under high pressure from the inlet end into the discharge end portion; and a rotary shaft slightly smaller in diameter than said portion disposed in said portion, for engaging said material and cooperating with said structure means to form an elongated chamber of annular cross-section; drive means for rotating said shaft and worm; the effective cross section of said chamber at all parts thereof being many times greater than the effective cross-section of said outlet, thereby allowing discharge of the material at said discharge end only in small amount, thereby causing the material to be compressed under very high pressure and to pass slowly to said discharge end; whereby the material is for a long time engaged, laterally rubbed, reduced and mixed under very high pressure by the shaft while moving toward the discharge end; the face of the shaft being constructed and arranged to provide means to restrain movement of the engaged material in a direction toward the discharge end.

15. In mixing and reducing apparatus, the combination of structure means providing an elongated space having an inlet end and a long mixing portion having a discharge outlet at the other end; means for forcing the material to pass from the inlet end into the mixing portion under high pressure; and a rotary mixing shaft slightly smaller in diameter than said mixing portion disposed in said mixing portion, for engaging, rubbing and mixing said material and cooperating with said structure means to form an elongated chamber of substantially annular cross-section having a length which is long relative to its outside diameter; drive means for rotating said shaft; the effective cross-section of said outlet being at least several times smaller than the effective cross-section of said chamber, thereby causing discharge of the material at said discharge end only in small amount, and causing the material to be compressed under very high pressure and causing the particles of the material to pass much more slowly through said chamber than through said outlet; whereby the material is for a long time engaged, laterally rubbed, reduced and mixed under very high pressure by the shaft while the material moves toward the outlet.

16. An apparatus as in claim 15, the face of said shaft being provided with a mixing worm having an outside diameter slightly smaller than the diameter of the chamber.

CHESTER E. OSBORNE.

REFERENCES CITED

The following references are of record in the file of this patent:

UNITED STATES PATENTS

| Number | Name | Date |
| --- | --- | --- |
| 1,935,050 | Gordon | Nov. 14, 1933 |